Figure 1:
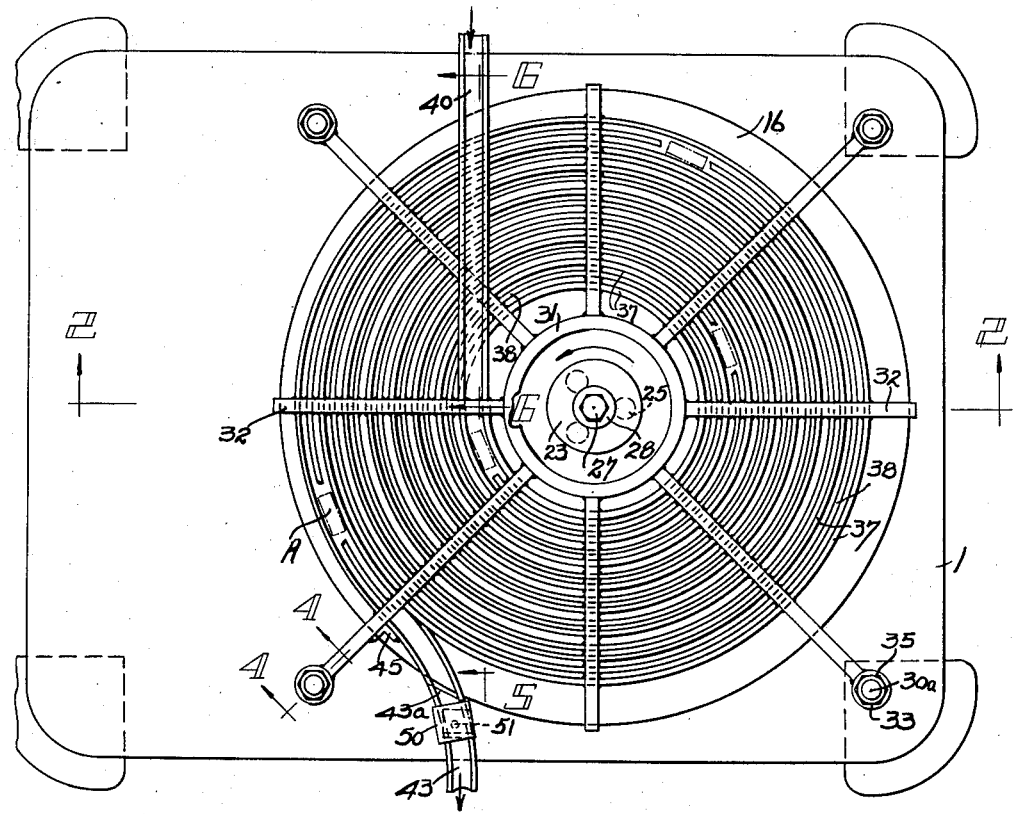

Feb. 10, 1959   J. G. KAY ET AL   2,873,019
DEVICES FOR RECEIVING, STORING AND DISCHARGING
WORKPIECES OR MACHINE PARTS
Filed July 13, 1955   2 Sheets-Sheet 1

INVENTORS
John G. Kay
BY John K. Rye

Gerald J. Baldwin

Feb. 10, 1959     J. G. KAY ET AL     2,873,019
DEVICES FOR RECEIVING, STORING AND DISCHARGING
WORKPIECES OR MACHINE PARTS
Filed July 13, 1955     2 Sheets-Sheet 2
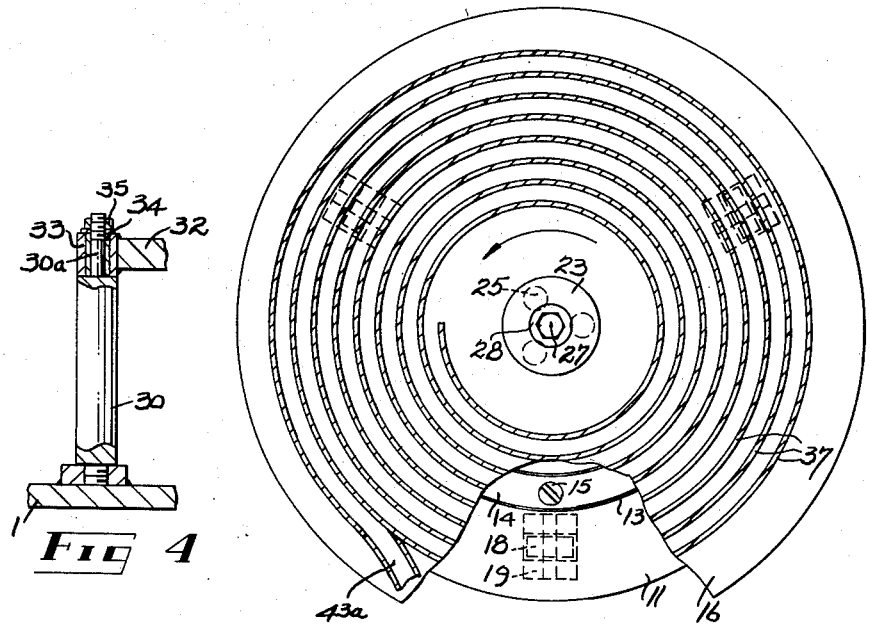
FIG 4
FIG 3
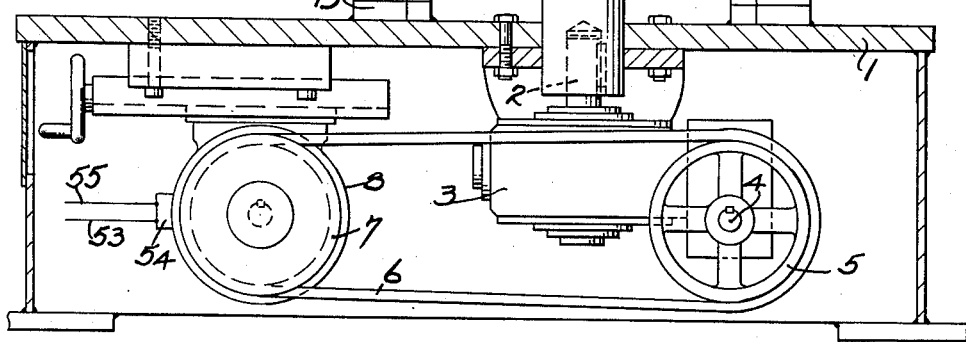
FIG 2
INVENTORS
John G. Kay
John K. Rye
BY
Gerald S. Baldwin

United States Patent Office 2,873,019
Patented Feb. 10, 1959

2,873,019

DEVICES FOR RECEIVING, STORING AND DISCHARGING WORKPIECES OR MACHINE PARTS

John G. Kay, Detroit, and John K. Rye, Southfield Township, Oakland County, Mich., assignors to F. Jos. Lamb Company, Detroit, Mich., a corporation of Michigan Application July 13, 1955, Serial No. 521,827

14 Claims. (Cl. 198—37)

This invention relates to improvements in devices for receiving, storing and discharging workpieces or machine parts.

It is an object of the invention to provide a device for receiving, storing and discharging workpieces or machine parts wherein ample storage space is provided to accommodate a large number of workpieces of any cross sectional form on a rotary horizontal disc, and includes means for guiding the workpieces so that they remain in line and follow a helical pattern during their travel upon the disc.

Another object of the invention is to provide such a device for receiving, storing and discharging workpieces or machine parts wherein a stationary helical guide is mounted above and spaced from the disc, and wherein the guide forms a continuous helical passage between each adjacent pair of convolutions, which are spaced a somewhat greater distance apart than the width of the workpieces being carried upon the disc. In this manner substantially the entire surface of the rotary disc is utilized for storage, and its capacity should be sufficient to store enough workpieces to permit continued operation of a machine to which the workpieces are discharged from the device during a temporary shut-down, as for tool changing, of another machine from which the workpieces are delivered onto the disc.

A further object of the invention is to provide such a device for receiving, storing and discharging workpieces or machine parts including conveying means for delivering the workpieces one at a time onto the rotary disc adjacent one extremity of the helical guide and between adjacent convolutions thereof, and another conveying means upon which the workpieces are discharged from the disc at the opposite end of the helical guide.

Another object of the invention is to provide such a device for receiving, storing and discharging workpieces or machine parts wherein means are provided for preventing one workpiece climbing onto another during their travel upon the rotary disc.

Another object of the invention is to provide such a device for receiving, storing and discharging workpieces or machine parts wherein the rotary disc is frictionally driven so that in the event of the workpieces jamming between convolutions of the guide, due to the presence of cuttings or other foreign matter, and their travel being stopped, the disc will cease to rotate. Moreover means are also provided for regulating the amount of resistance required to halt rotation of the disc.

Yet another object of the invention is to provide such a device for receiving, storing and discharging workpieces or machine parts wherein means are provided for automatically increasing the speed of rotation of the disc when no workpieces are passing therefrom onto the discharge conveying means, thereby reducing the time lag before more workpieces reach the said discharge conveying means after a temporary shut-down of the machine from which the workpieces are delivered onto the disc.

Figure 6:
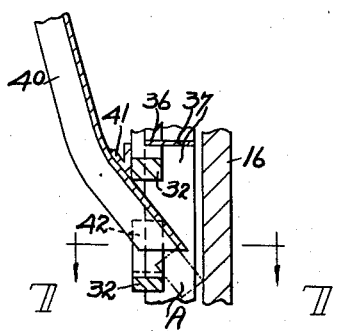
Figure 5:
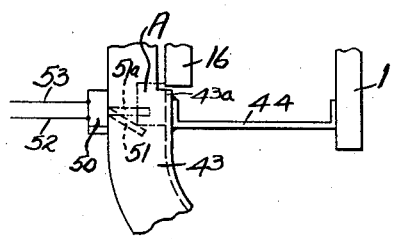
Figure 7:
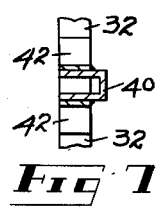

Figure 1 is a plan view of the invention, and
Figure 2 is a side view thereof taken partly as a section on the line 2—2 of Figure 1.
Figure 3 is a section on the line 3—3 of Figure 2.
Figures 4, 5 and 6 are sections on the lines 4—4, 5—5 and 6—6 respectively of Figure 1, and
Figure 7 is a section on the line 7—7 of Figure 6.

Referring to the drawings, 1 designates a stand upon which a vertical drive shaft 2 is rotatably supported. In the present instance the drive shaft projects upwardly from a reduction unit 3 mounted on the stand and having a driven shaft 4 on which a pulley 5 is secured. Passing around the pulley 5 is a belt 6 which also extends around a pulley 7 secured upon the shaft of an electric motor 8 fastened upon the stand 1. In the present instance the pulley 7 is of the type wherein means are provided for increasing or decreasing the diameter of that portion of its periphery upon which the belt 6 bears to increase or decrease the speed of rotation of the reduction unit 3. Mounted upon the upper extremity of the drive shaft 2 is a hub 9 terminating at its upper extremity in a plate 10 upon which a driving disc 11 is secured as by screws 12. Formed in the upper face of the driving disc 11 is an annular groove 13 in which a suitable drive ring 14, usually made of fiber, is secured as by screws 15. 16 denotes a carrier disc having a frictionally driven ring 17 dependingly secured thereto which extends into the groove 13 and bears upon the drive ring 14 which turns the said disc 16 upon rotation of the driving disc 11. The latter is also rotatably supported on rollers 18 carried in bearings 19 which are suitably secured upon the stand 1.

The driving disc 11 is provided with an axial threaded opening 20 to receive the correspondingly threaded lower extremity of a spindle 21 which extends through a bushing 22 pressed or otherwise suitably secured through the carrier disc 16. Provided around the spindle 21 for axial movement are spaced upper and lower annular plates 23 and 24 between which helical springs 25 are arranged. The lower plate 24 rests upon a thrust bearing 26 the underside of which is supported on the carrier disc 16. The spindle 21 is internally threaded from its upper extremity to receive a screw 27, which, when tightened, exerts pressure through a washer 28 upon the upper annular plate 23, and through the springs 25 and lower plate 24 upon the carrier disc 16. Thus by adjusting the screw 27 the pressure exerted by the frictionally driven ring 17 on the drive ring 14 may be regulated.

Welded or otherwise suitably secured to and extending upwardly from the stand 1 are a plurality of columns 30 which terminate at their upper extremities in threaded portions 30a of reduced diameter. 31 denotes an annular frame outwardly spaced around the plates 23 and 24, and extending horizontally outward from and integral with the said frame are a plurality of radial arms 32, some of which, in the present instance each alternate arm, are provided at their outer extremities with apertured bosses 33. Mounted in each boss is a bushing 34 which fits around the reduced upper extremity 30a of one of the columns and is held in position by a nut 35 in threaded engagement with that upper extremity.

Formed across the arms 32 from their undersides concentric with the annular frame 31 are a plurality of uniformly spaced vertical slots 36. 37 denotes a resilient helical guide, usually made of spring steel, each convolution of which is dependingly mounted in one slot in each arm 32 so that its lower extremity is spaced somewhat above the carrier plate 16. Welded or otherwise secured to the undersides of the arms 32 and centrally spaced between adjacent pairs of convolutions of the helical guide 37 is a helical hold-down strip 38 preferably of circular section. This hold-down strip is positioned above the workpieces being transported on the carrier plate but sufficiently close to them to prevent one workpiece mounting upon the one ahead in the event that movement of the latter is checked or stopped by cuttings or other foreign matter becoming wedged between the workpiece and one side of the helical guide, or if the carrier disc should become filled and discharge therefrom be halted due to the machine to which parts or workpieces from the device are fed being stopped. It will of course be apparent that the spacing between adjacent convolutions of the helical guide must be somewhat greater than the width of the workpieces being handled, and that the width must be increased in the event that relatively long workpieces are to be handled. It will also be noted that flat or multi-sided workpieces may be handled as readily as those of circular section. Again due to the construction of the device the annular frame 31 may be readily removed so that another provided with a helical guide 37 the convolutions of which are differently spaced may be substituted to accommodate workpieces of a different width.

The workpieces A are delivered onto the carrier disc 16 by a suitable conveying means from a machine or other source of supply—not shown. In the present instance the conveying means consists of a channel-shaped gravity chute 40 the outlet end of which is tangent to the center line between the two inner convolutions of the guide 37. This chute may be supported at its outlet extremity by brackets 41 and 42 secured to two adjacent arms 32. Similarly a second conveying means, also consisting of a gravity chute 43, is secured as by a bracket 44 mounted on the stand 1 and at its inner extremity it may be attached by a bracket 45 to one of the arms 32, so that it extends directly from between the outer convolution of the helical guide 37 and the convolution adjacent thereto. The underside of the inner portion of the chute 43 is cut away so that workpieces ride upon the disc 16 to its outer periphery outwardly from which the chute is of full channel section as indicated at 43a.

Mounted on the chute 43 is a switch 50 an actuating member 51 of which assumes the inclined position shown when workpieces A are passing, but immediately moves to its normal vertical position 51a when no workpieces are passing. Connected to the switch 50 is a lead 52 which extends to a source of power (not shown) and a second lead 53 which terminates in a control member 54 of a well known make, indicated in Figure 2, by which the diameter of the bearing face on the pulley 7 for the belt 6 is adapted to be changed. The control member 54 is also connected to the source of power by a lead 55. In this manner when the chute 43 is empty and no workpieces are passing the switch 50 the speed of rotation of the carrier disc 16 is increased to cut down the time interval before other workpieces reach the actuating member 51.

While in the foregoing the preferred embodiment of the invention has been described and shown, it is understood that alterations and modifications may be made thereto provided the said alterations and modifications fall within the scope of the appended claims.

What we claim is:

1. A device for receiving, storing and discharging workpieces, including a stand, a vertical shaft supported for rotation thereon, means for turning the shaft, a driving disc mounted on the shaft for rotation therewith and having an annular groove in its upper face, a drive ring secured in said groove, a carrier disc supported for rotation over the driving disc, a driven ring depending from the carrier disc and bearing upon the drive ring, adjustable means for increasing and decreasing pressure upon the carrier disc to increase or decrease the tendency of the carrier disc to turn with the driving disc, a resilient helical guide supported by the stand over and spaced from the carrier disc for guiding workpieces thereon along a helical path between adjacent convolutions as the carrier disc rotates, conveying means for delivering the workpieces onto the carrier disc between two adjacent convolutions toward one extremity of the helical guide, and another conveying means extending from adjacent the opposite extremity of the helical guide for receiving and discharging the workpieces from the carrier disc.

2. In an apparatus for receiving workpieces from one machine, storing said workpieces, and thereafter delivering said workpieces to another machine as required, the combination comprising a base member mounted for rotation about a vertical axis, means for rotating said member, a table member mounted on said base member for rotation about the axis of rotation of said base member, means forming a frictional driving connection between said base member and said table member, said means comprising an annular ring on one of said members and a groove in which said ring rides on the other of said members, a spiral guide, means for mounting said spiral guide in fixed position above said table member with the axis thereof in alignment with the axis of rotation of said base member and said table member, means for supplying workpieces to said table member at the innermost convolution of said spiral guide, and means for receiving workpieces from said table member at the outermost convolution of said spiral guide.

3. The combination set forth in claim 2 wherein said ring is provided on the under surface of said table member and said groove is provided on the upper surface of said base member.

4. The combination set forth in claim 2 including an annular friction member mounted in the base of said groove.

5. In an apparatus for receiving workpieces from one machine, storing said workpieces, and thereafter delivering said workpieces to another machine as required, the combination comprising a driving disc, means for supporting said disc for rotation about a vertical axis, a shaft projecting upwardly from the top surface of said driving disc, a carrier disc rotatably mounted on said shaft, the under surface of said carrier disc and the upper surface of said driving disc being provided with cooperating friction surfaces, means for applying a yielding axially downward force on said carrier disc thereby forming a frictional driving connection between said carrier disc and said driving disc through said cooperating friction surfaces, a spiral guide mounted in fixed position above said carrier disc with the axis thereof in alignment with the axis of said shaft, means for delivering workpieces to the carrier disc at the innermost convolution of said spiral guide, and means for receiving workpieces from the carrier disc at the outermost convolution of said spiral guide.

6. The combination set forth in claim 5 wherein said means for applying a yielding axially downward force on said carrier disc is adjustable to vary the torque between said carrier disc and driving disc.

7. The combination set forth in claim 6 wherein said means for applying a yielding axially downward force comprises a first member on said carrier disc and a second member mounted on said shaft above said carrier disc, spring means interposed between said two members thereby applying an axially downward force on said driving disc.

8. In an apparatus for receiving workpieces from one machine, storing said workpieces, and thereafter delivering said workpieces to another machine as required, the combination comprising a first member, means for mounting said first member for rotation about a vertical axis, means for rotating said first member, a second member comprising a flat plate mounted for rotation about the axis of said first member, means forming a driving connection between said first member and said second member, a spiral guide, means for mounting said spiral guide in fixed position above said second member with the axis thereof in alignment with the axis of rotation of said member, means for supplying workpieces to said second member at the innermost convolution of said spiral guide, means for receiving workpieces from said second member at the outermost convolution of said spiral guide, and means responsive to the absence of workpieces in said means for receiving workpieces from said second member to cause said means for rotating said first member to rotate at a greater rate.

9. In an apparatus for receiving workpieces from one machine, storing said workpieces, and thereafter delivering said workpieces to another machine as required, the combination comprising a table mounted for rotation about a vertical axis, a spiral guide, means for mounting said spiral guide in fixed position in spaced relationship above said table with the axis thereof substantially in alignment with the axis of rotation of said table for guiding workpieces in succession on said table along a spiral path between adjacent convolutions of said spiral guide as the table rotates, means for supplying workpieces to said table at the innermost convolution of said spiral guide, means for receiving workpieces from said table at the outermost convolution, a support member for supporting said table, said member having its axis in alignment with the axis of said table, means for rotating said support member, means forming a frictional driving connection between said table and support member and comprising friction surfaces between said table and support member, and means for varying the contact pressure between said friction surfaces, whereby when said support member is rotated said table is also normally rotated below said spiral guide through said frictional driving connection thereby moving the workpieces on said table in a spiral path toward the outermost convolution of said spiral guide except when the rotation of said table is interrupted as by foreign particles at which time said frictional driving connection permits slippage between said rotating support member and said path, thereby preventing damage to the workpieces or apparatus.

10. The combination set forth in claim 9 wherein said means for varying the contact pressure between said friction surfaces comprises spring means for applying an axially downward force on said table.

11. The combination set forth in claim 10 wherein a bearing is interposed between said spring means and said table.

12. In an apparatus for receiving workpieces from one machine, storing said workpieces, and thereafter delivering said workpieces to another machine as required, the combination comprising a table mounted for rotation about a vertical axis, a spiral guide, means for mounting said spiral guide in fixed position in spaced relationship above said table with the axis thereof substantially in alignment with the axis of rotation of said table for guiding workpieces in succession on said table along a spiral path between adjacent convolutions of said spiral guide as the table rotates, means for supplying workpieces to said table at the innermost convolution of said spiral guide, means for receiving workpieces from said table at the outermost convolution, a column supporting said table and coaxial therewith, means for rotating said column, means forming a driving connection between said column and said table, said means for supporting said spiral guide comprising a frame having a plurality of radial arms, at least some of said arms being supported adjacent their outer ends, said arms extending radially inwardly toward said column and terminating at their inner ends at points spaced from said column, and means also spaced radially from said column and interconnecting said arms adjacent their inner ends, said spiral guide comprising a thin metal strip bent in the form of a spiral and secured to the under side of said radial arms with the plane of said strip perpendicular to the plane of said arms.

13. The combination set forth in claim 12 wherein said means interconnecting said arms comprises a ring secured to the inner ends of said arms.

14. In an apparatus for receiving workpieces from one machine, storing said workpieces, and thereafter delivering said workpieces to another machine as required, the combination comprising a table mounted for rotation about a vertical axis, a spiral guide, means for mounting said spiral guide in fixed position in spaced relationship above said table with the axis thereof substantially in alignment with the axis of rotation of said table for guiding workpieces in succession on said table along a spiral path between adjacent convolutions of said spiral guide as the table rotates, means for supplying workpieces to said table at the innermost convolution of said spiral guide, means for receiving workpieces from said table at the outermost convolution, a support member for supporting said table, means forming a driving connection between said table and said support member, means for mounting said support member for rotation comprising a base, a plurality of rollers mounted on said base in spaced relationship to one another beneath said support member and contacting the under side of said support member, the axes of said rollers extending generally horizontally and radially from the axis of rotation of said support member, and means for preventing the lateral movement of said support member relative to said base.

References Cited in the file of this patent

UNITED STATES PATENTS

| 774,177 | Hopkins et al. | Nov. 8, 1904 |
| 1,225,172 | Privett | May 8, 1917 |
| 1,508,827 | Valiquet | Sept. 16, 1924 |
| 2,594,337 | Noe | Apr. 29, 1952 |
| 2,599,221 | Bergmann | June 3, 1952 |